(12) United States Patent
Im et al.

(10) Patent No.: US 8,216,669 B2
(45) Date of Patent: Jul. 10, 2012

(54) COMPOSITION FOR ANTI-GLARE FILM AND ANTI-GLARE FILM PREPARED USING THE SAME

(75) Inventors: Sang-Hyuk Im, Daejeon (KR); Yeong-Rae Chang, Daejeon (KR); Jae Pil Koo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 292 days.

(21) Appl. No.: 12/451,464

(22) PCT Filed: May 16, 2008

(86) PCT No.: PCT/KR2008/002769
§ 371 (c)(1),
(2), (4) Date: Nov. 13, 2009

(87) PCT Pub. No.: WO2008/140283
PCT Pub. Date: Nov. 20, 2008

(65) Prior Publication Data
US 2010/0238558 A1  Sep. 23, 2010

(30) Foreign Application Priority Data
May 16, 2007  (KR) .................. 10-2007-0047603

(51) Int. Cl.
*B32B 5/16* (2006.01)
*G02B 5/02* (2006.01)
*G02B 13/20* (2006.01)
*C08L 33/00* (2006.01)
*C04B 24/26* (2006.01)

(52) U.S. Cl. ......... 428/327; 428/323; 359/599; 524/523

(58) Field of Classification Search .................. 428/327, 428/323; 359/599, 614; 524/81, 502, 523
See application file for complete search history.

(56) References Cited

U.S. PATENT DOCUMENTS

| 5,422,227 | A * | 6/1995 | Hotta et al. ............... 430/285.1 |
| 6,343,865 | B1 | 2/2002 | Suzuki |
| 6,607,936 | B2 | 8/2003 | Nomura |
| 2002/0176169 | A1 * | 11/2002 | Shoshi et al. ................ 359/585 |
| 2004/0197550 | A1 | 10/2004 | Ke et al. |
| 2005/0064142 | A1 * | 3/2005 | Matsunaga et al. .......... 428/141 |
| 2006/0057344 | A1 * | 3/2006 | Sakurai et al. ............... 428/212 |
| 2006/0227695 | A1 | 10/2006 | Nagaoka |
| 2007/0076298 | A1 | 4/2007 | Murata et al. |
| 2007/0253064 | A1 | 11/2007 | Ookubo et al. |
| 2008/0186582 | A1 | 8/2008 | Matsuura et al. |
| 2008/0213513 | A1 | 9/2008 | Kameshima et al. |

FOREIGN PATENT DOCUMENTS

| JP | 8-75909 A | 3/1996 |
| JP | 09-251101 | 3/1999 |
| JP | 11286083 A | 10/1999 |
| JP | 2000-258606 A | 9/2000 |
| JP | 2003-025504 | 1/2003 |
| JP | 2003-260748 | 9/2003 |
| JP | 2003-322703 A | 11/2003 |
| JP | 3507344 | 12/2003 |
| JP | 2004-115599 | 4/2004 |
| JP | 2004-230867 A | 8/2004 |
| JP | 2005-4163 A | 1/2005 |
| JP | 2006-143968 | 6/2006 |
| JP | 2006-145736 | 6/2006 |
| JP | 2008-040064 A | 2/2008 |
| KR | 10-0296369 | 9/1999 |
| WO | WO 2007/020870 A1 | 2/2007 |
| WO | WO 2007/040023 A1 | 4/2007 |

OTHER PUBLICATIONS

George Wypych; Handbook of Fillers, $2^{nd}$ Edition; 2000; p. 132.*

* cited by examiner

*Primary Examiner* — Karuna P Reddy
(74) *Attorney, Agent, or Firm* — McKenna Long & Aldridge LLP

(57) ABSTRACT

The present invention provides a composition for an anti-glare film that includes a binder resin; and an organic particle which is included in an amount of 1 to 30 parts by weight based on 100 parts by weight of the binder resin and in which concave and convex patterns are formed on a surface thereof, and an anti-glare film that is manufactured by using the same. Accordingly, the storage stability of a particle that is included in an anti-glare film for high resolution is improved to increase the durability and a lifespan of products, a glare phenomenon that is caused by incident light and recognized by an user is prevented, and image clarity and contrast ratio that is realized by using an image display device are improved.

20 Claims, 4 Drawing Sheets

[Fig. 1]
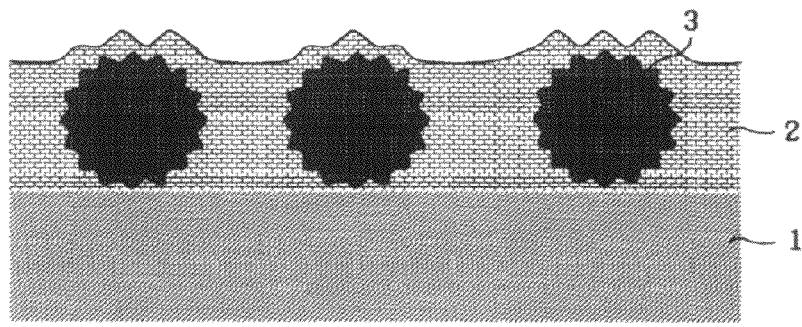
[Fig. 2]
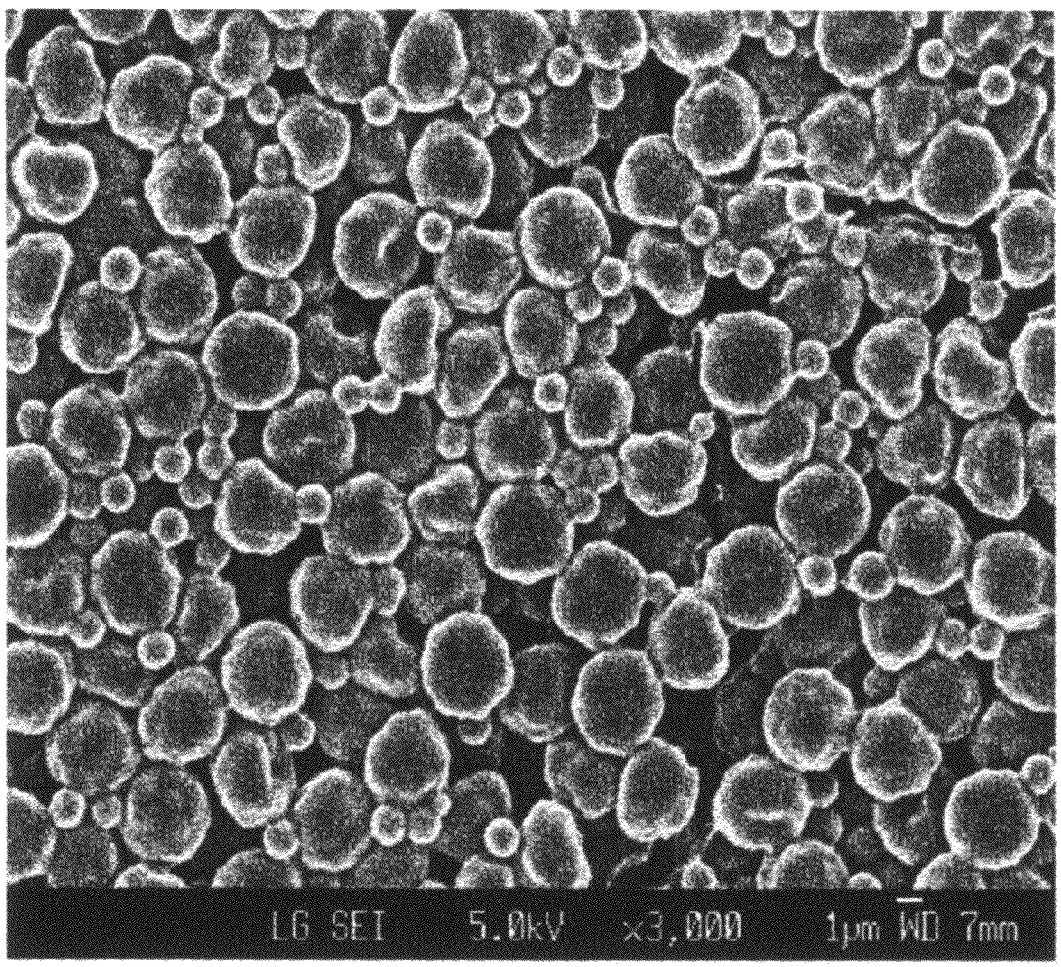

[Fig. 3]
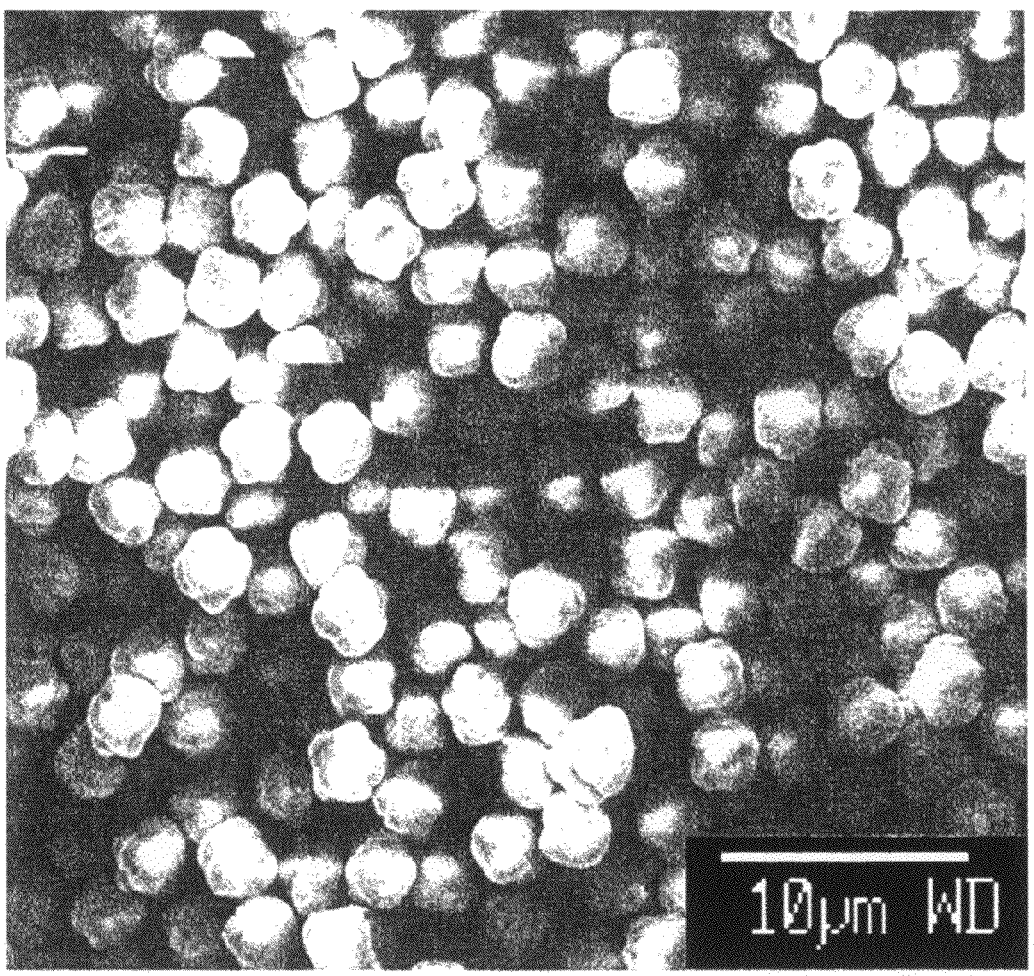

[Fig. 4]
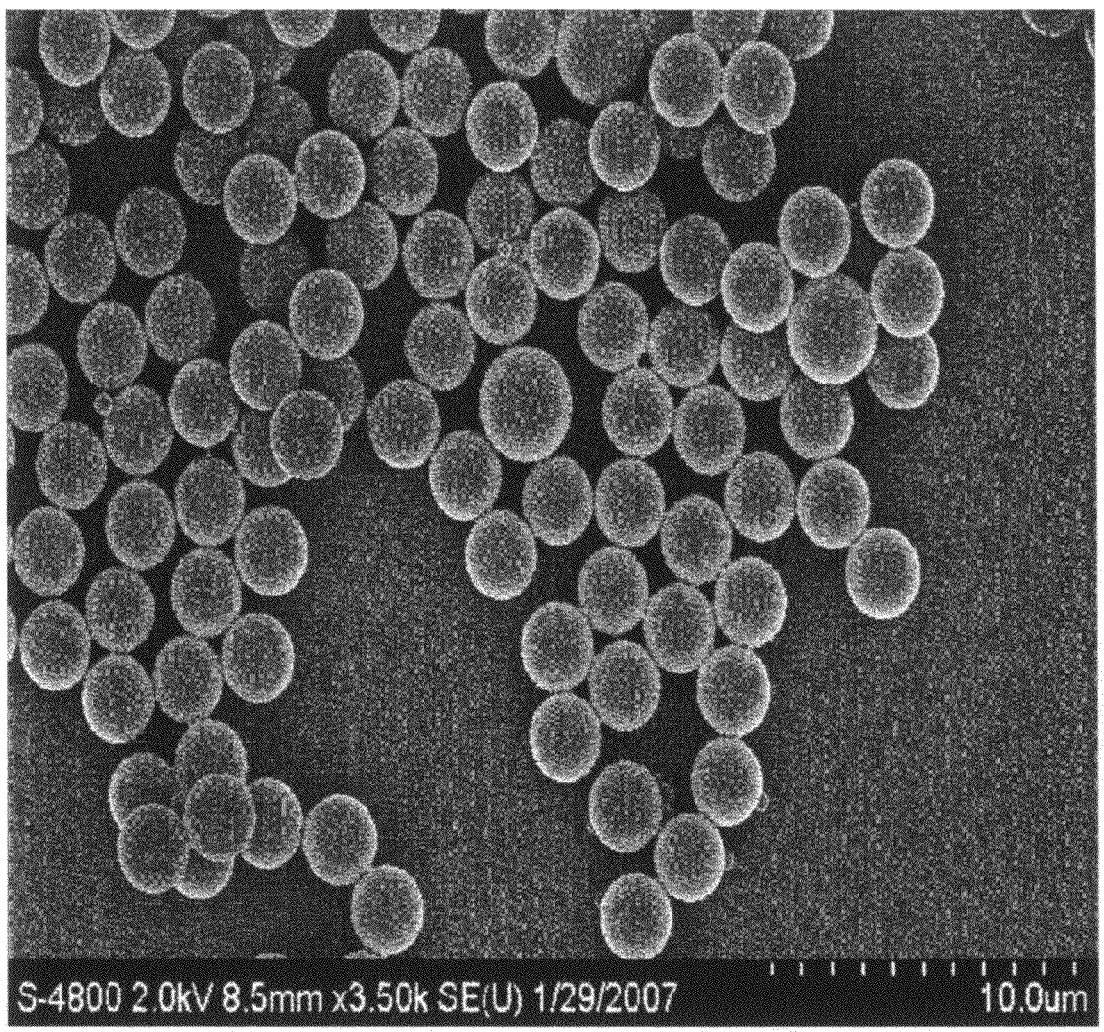

[Fig. 5]
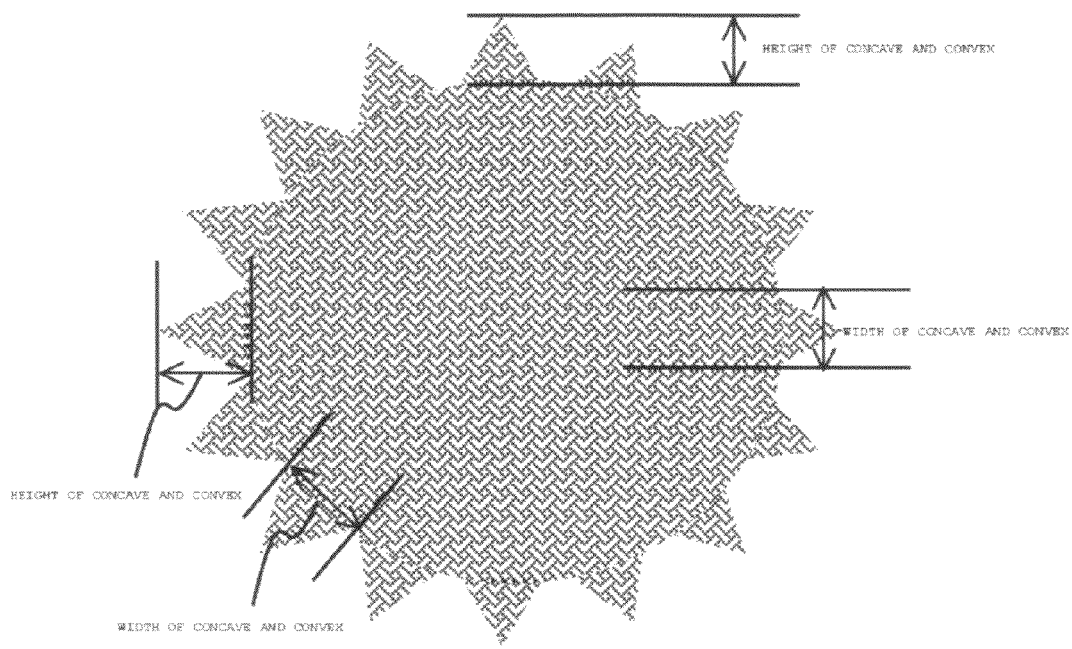

COMPOSITION FOR ANTI-GLARE FILM AND ANTI-GLARE FILM PREPARED USING THE SAME

TECHNICAL FIELD

The present invention relates to a composition for an anti-glare film which has excellent storage stability, anti-glare property, image clarity and contrast and is capable of being applied to high resolution displays, and an anti-glare film that is produced by using the same.

This application is a National Stage Entry of International Application No. PCT/KR2008/002769, filed May 16, 2008, and claims priority to Korean Patent Application No. 10-2007-0047603, filed in Korea on May 16, 2007, which is hereby incorporated by reference in its entirety as if fully set forth herein.

BACKGROUND ART

Currently, in accordance with the trend toward the high-speed and high density of information transfer, and requirement of consumers for high-quality products such as large screen, high-quality images, multifunction and high performance, large-sized flat panel displays (FPD) are used. In accordance with the trend toward large size and slimness of displays and an increase in demand for notebook PC, various types of flat panel displays such as LCDs, PDPs, Rear-projection TVs and the like are developed and commercialized. However, in the case the displays are exposed to external light such as natural light, the surface reflection light provides fatigueness to eyes of the user or causes a headache, and an image clarity that is formed in the display is not recognized as a clear image.

In order to solve the disadvantages of the prior art, the concave and the convex are formed on the display surface to scatter external light on the surface, thereby obtaining the anti-glare effect. However, there is a problem in that the image is reduced on the high resolution display. In order to solve this, a method of adding particles for inducing the internal scattering to the coating layer are suggested.

In order to solve the problems occurring in the prior art, various prior arts are suggested, the suggestions will be described, disadvantages thereof will be analyzed and technologies for solving this will be suggested.

Korean Registered Patent No. 10-046782 discloses a high resolution anti-glare coating layer that includes a first particle having an average diameter of 0.05 to 1 µm, in which a difference between refractive indices of an acrylate binder resin and the first particle is 0.2 to 0.5, and a second particle having an average diameter of 0.5 to 3 µm, in which a difference between refractive indices of an acrylate binder resin and the first particle is not more than 0.1. However, there is a disadvantage in that since a difference between refractive indices of the acrylate binder resin and the first particle is high, the contrast is reduced.

Meanwhile, Korean Registered Patent No. 10-037840 and Japanese Unexamined Patent Application Publication No. 2001-3178 disclose an anti-glare coating layer that includes at least two or more light transmissive particles in a binder resin, in which a difference between refractive indices of the light transmissive particle and the binder is 0.03 to 0.2 and the light transmissive particles have different refractive indices. However, there is a disadvantage in that the anti-glare property is reduced on the basis of the same image clarity and haze value and the contrast is reduced because of the haze of 10% or more.

In addition, Korean Registered Patent No. 10-0296369 discloses an anti-glare coating layer including a light transmissive diffusing agent in a binder resin, in which the external haze value by the concave and the convex of the surface thereof is 7 to 30, and the internal haze value by the light transmissive diffusing agent is 1 to 15. However, there is a disadvantage in that the contrast is reduced because of the high surface haze value. Japanese Unexamined Patent Application Publication No. 2002-67675 discloses an anti-glare coating layer that includes a spherical particle having a refractive index of 1.55 or more in a binder resin and an amorphous particle having a refractive index of 1.48 or less, in which the thickness of the binder resin is more than the average diameter of the spherical particle. However, there is a disadvantage in that the anti-glare property is reduced on the basis of the same image clarity and haze value.

Japanese Unexamined Patent Application Publication No. 2002-185927 discloses an anti-glare coating layer that includes an organic substance particle having an average diameter of 1 to 7 µm and an inorganic substance particle having an average diameter of 0.1 µm in the binder resin, in which the thickness of the binder resin is 0.3 to 3 times more than the average diameter of the organic substance particle. However, since the inorganic substance particle is not attached to the surface of the organic substance particle, there is a problem in that the concave and the convex cannot be formed on the surface by the inorganic substance particle, thus reducing the anti-glare effect because of the particles.

Japanese Registered Patent No. 3507344 discloses an anti-glare coating layer including at least one light transmissive particle in a binder resin, in which a difference between refractive indices of the light transmissive particle and the binder resin is 0.3 or less and which is protruded from the surface of the binder resin layer by 0.1 to 0.3 µm. However, there is a problem in that the anti-glare property is reduced on the basis of the same image clarity and haze value.

Korean Unexamined Patent Application Publication No. 10-2005-0006349 discloses a light absorption layer that includes metal oxide having a core-shell structure and a solar battery that is provided with the same. However, since indeterminate form metal oxide crystals having the high refractive index are used as a core and a shell consists of an amorphous or crystal metal oxide, there is a problem in that it cannot be applied to a composition for anti-glare coating.

In general, in the anti-glare coating film, the haze relates to external scattering because of roughness of the coating layer surface and internal scattering because of a filler in a binder resin, the anti-glare effect relates to external scattering because of the surface roughness, and the image clarity relates to the degree of diffusion of light. In addition, the degree of diffusion of light relates to a difference between refractive indices of the binder resin and the particle and the surface roughness of the coating layer. In particular, the image clarity is reduced as the surface of the coating layer becomes rough. Accordingly, since the image clarity and the anti-glare property are in an inverse proportion, in the production of the anti-glare coating film for high resolution display having the excellent image clarity and anti-glare property, the controlling of the surface roughness may be an important technical factor.

In the case of the known spherical particle, it is difficult to produce an anti-glare coating film having the excellent image clarity and anti-glare property, and RGB pixels are mixed with each other because of the lens effect of the particle.

In addition, generally, in the case the crosslinked organic substance particles are used, a good solvent is used to perform monodispersion of the particles. However, in this case, since the crosslinked particles are swollen and the surface thereof becomes sticky, collision occurs between the particles and the particles are coagulated. Thus, there is a problem in that the storage stability of the coating composition is reduced.

DISCLOSURE OF INVENTION

Technical Problem

The present invention has been made keeping in mind the problems occurring the prior art. That is, the present invention has been made to a problem in which a function is reduced in order to improve another function because a technical improvement of the anti-glare effect and the image clarity cannot be obtained if the prior art is used. In order to solve this problem, an object of the present invention is to provide a composition for the anti-glare film, which includes organic particle in which the surface roughness is controlled, the storage stability is excellent, the anti-glare property is excellent, and can be applied to a display to provide a high resolution display having the excellent image clarity and contrast, and an anti-glare film produced by using the same.

Technical Solution

The present invention provides a composition for an anti-glare film that comprises a binder resin; and an organic particle which is included in an amount of 1 to 30 parts by weight based on 100 parts by weight of the binder resin and in which concave and convex patterns are formed on a surface thereof.

The present invention provides an anti-glare film that includes a binder resin; and an anti-glare layer that includes an organic particle which is included in an amount of 1 to 30 parts by weight based on 100 parts by weight of the binder resin and in which concave and convex patterns are formed on a surface thereof.

Advantageous Effects

According to the present invention, the storage stability of an organic particle that is included in an anti-glare film for high resolution is improved to increase the durability and a lifespan of products, a glare phenomenon that is caused by incident light and recognized by an user is prevented, and image clarity and contrast ratio that is realized by using an image display device are improved.

BRIEF DESCRIPTION OF THE DRAWINGS

FIG. 1 is a sectional view of an anti-glare film according to an embodiment of the present invention;

FIG. 2 illustrates scanning electronic microscope (SEM) pictures of organic particles that are used in the anti-glare films according to Example 1, Comparative Example 1 and Comparative Example 2;

FIG. 3 is a scanning electronic microscope (SEM) picture of organic particle that is used in the anti-glare film according to Example 2;

FIG. 4 is a scanning electronic microscope (SEM) picture of organic particle that is used in the anti-glare film according to Comparative Example 3; and FIG. 5 is a view that illustrates a height and a width of each of concave and convex patterns in an organic particle in which the concave and the convex patterns are formed on a surface thereof.

BEST MODE FOR CARRYING OUT THE INVENTION

A composition for an anti-glare film according to the present invention comprises a binder resin; and an organic particle which is included in an amount of 1 to 30 parts by weight based on 100 parts by weight of the binder resin and in which concave and convex patterns are formed on a surface thereof.

A curable acrylate-based binder resin may be used as the binder resin. The type thereof is not limited to the examples, but a typical resin that is used in the art to which the present invention belongs may be selected to be used without a limit.

For example, a single material or a mixture of two or more materials selected from a reactive acrylate oligomer and a polyfunctional acrylate monomer may be used. In connection with this, the reactive acrylate oligomer is an oligomer that includes at least one acrylate functional group capable of participating in the curing reaction, and the polyfunctional acrylate monomer is a monomer that includes one or more acylate functional group capable of participating in the curing reaction.

The type of the reactive acrylate oligomer and the polyfunctional acrylate monomer is not limited thereto, but a typical resin that is used in the art to which the present invention belongs may be selected to be used without a limit.

Examples of the reactive acrylate oligomer may include a single material or a mixture of two or more materials selected from urethane acrylate oligomer, an epoxy acrylate oligomer, polyester acrylate and polyether acrylate.

Examples of the polyfunctional acrylate monomer may include a single material or a mixture of two or more materials selected from dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylopropane ethoxy triacrylate, 1,6-hexanedioldiacrylate, propoxylated glycero triacrylate, tripropylene glycol diacrylate and ethyleneglycol diacrylate.

The type of the binder resin is not limited thereto, but a typical resin that is used in the art to which the present invention belongs may be selected to be used without a limit.

The organic particle may be included in an amount of 1 to 30 parts by weight based on 100 parts by weight of the binder resin.

In the case the amount is less than 1 parts by weight, the haze value is not sufficiently realized because of internal scattering. In the case the amount is more than 30 parts by weight, the viscosity is increased to make the coating property poor and the haze value is very high because of the internal scattering. Thus, the contrast ratio may be reduced.

An average particle diameter of the organic particle in which concave and convex patterns are formed on a surface thereof may be in the range of 1 to 10 μm.

In the case the average particle diameter is less than 1 μm, the contrast ratio may be reduced because of the milky haze. In the case the average particle diameter is more than 10 μm, since the number of internal fillers is reduced, the internal scattering effect is reduced. Thus, it is difficult to obtain the sufficient haze value.

In the organic particle having the surface roughness because the concave and the convex patterns are formed, the height of the concave and the convex is in the range of 0.01 to 2 μm, and a width of the concave and the convex is in the range of 0.01 to 4 μm.

In connection with this, the height of the concave and the convex, as shown in FIG. 5, is a distance between the lowermost portion of the concave and the uppermost portion of the convex, and the width of the concave and the convex is a distance between the concave portions.

In the case the height of the concave and the convex is less than 0.01 μm and the width thereof is less than 0.01 μm, since the size of the concave and the convex formed by the organic particle is small, the scattering effect is insignificant and the improvement in anti-glare effect is insignificant.

In the case the height of the concave and the convex is more than 2/ml and the width thereof is more than 4 μm, the image clarity in respects to the anti-glare effect may be reduced.

A total distribution ratio of the concave and the convex of the organic particle may be in the range of 10 to 100% of a total surface area of the organic particle.

In connection with this, in the case the total distribution ratio of the concave and the convex is less than 10%, since the effective number of the concave and the convex to realize the improvement in anti-glare effect is small, it is difficult to realize the anti-glare effect in practice.

In addition, the concave and the convex patterns may be continuously or discontinuously formed as shown in FIG. 5.

In the organic particle having the surface roughness because the concave and the convex patterns are formed, any method of forming concave and convex patterns, which is known in the art, may be used as the method of forming the concave and the convex patterns.

The controlling of the concave and the convex of the polymer particle such as the organic particle may be performed by using a phase separation method, and the shape and the distribution of the concave and the convex may be controlled by thermodynamic and kinetic controlling.

A difference between average refractive indices of the organic particle and the binder resin may be in the range of 0.01 to 0.3

In the case the difference between average refractive indices of the organic particle and the binder resin is less than 0.01, it is difficult to obtain the sufficient haze value because of the inner scattering. In the case the difference is more than 0.3, the haze value is increased because of the internal scattering while the transmittance is reduced, thus reducing the contrast ratio.

The organic particle may be formed of a single material or a copolymer of two or more materials selected from polystyrene, polymethyl methacrylate, polymethyl acrylate, polyacrylate, polyacrylate-co-styrene, polymethylacrylate-co-styrene, polymethylmethacrylate-co-styrene, polycarbonate, polyvinyl chloride, poly-butyleneterephthalate, polyethyleneterephthalate, polyamides, polyimides, polysulfone, polyphenylene oxide, polyacetal, epoxy resin, phenol resin, silicon resin, melamine resin, benzoguanamine, polydivinylbenzene, polydivinylbenzene-co-styrene, polydivinylbenzene-co-acrylate, polydiallyl phthalate, and triallylisocyanurate polymer.

In addition, the composition for an anti-glare film according to the present invention may further include an organic solvent, and the organic solvent may be added in an amount of 50 to 500 parts by weight based on 100 parts by weight of the binder resin. Preferably, the composition for an anti-glare film according to the present invention may include a binder resin, an organic particle and an organic solvent.

In the case the amount of the organic solvent is less than 50 parts by weight, since the viscosity of the coating composition is very high, the coating property may be poor. In the case the amount of the organic solvent is more than 500 parts by weight, the film strength of the coating film is reduced and it is difficult to manufacture it as a thick film.

The organic solvent may be a single material selected from $C_1$ to $C_6$ lower alcohols, acetates, ketones, cellosolves, dimethylformamide, tetrahydrofuran, propylene glycol monomethyl ether, toluene, and xylene, or a mixture thereof.

In connection with this, as the lower alcohols, a material selected from methanol, ethanol, isopropyl alcohol, butyl alcohol, isobutyl alcohol, and diacetone alcohol may be used. As the acetates, a material selected from methyl acetate, ethyl acetate, isopropyl acetate, butyl acetate, and cellosolve acetate may be used, and as the ketones, a material selected from methyl ethyl ketone, methyl isobutyl ketone, acetyl acetone, and acetone may be preferably used, but not limited thereto.

The composition for an anti-glare film according to the present invention may further include a UV curing initiator for the purpose of the curing by UV irradiation, and the UV curing initiator may be added in an amount of 0.1 to 10 parts by weight based on 100 parts by weight of the binder resin. Preferably, the composition for an anti-glare film according to the present invention may include a binder resin, an organic particle, an organic solvent, and a UV curing initiator.

The UV curing initiator may be added in an amount of 0.1 to 10 parts by weight based on 100 parts by weight of the binder resin. In the case the amount of the UV curing initiator is less than 0.1 parts by weight, the sufficient curing may not occur. In the case the amount of the UV curing initiator is more than 10 parts by weight, the film strength of the anti-glare film may be reduced.

As the UV curing initiator, a single material selected from 1-hydroxy cyclo-hexylphenyl ketone, benzyl dimethyl ketal, hydroxy dimethyl acetophenone, benzoine, benzoine methyl ether, benzoine ethyl ether, benzoine isopropyl ether, and benzoine butyl ether, or a mixture of two or more materials may be used preferably, but not limited thereto.

The composition for an anti-glare film according to the present invention may further include one or more additives selected from a leveling agent, a wetting agent, a defoaming agent and silica having an average particle diameter in the range of 1 to 5) nm.

The additives may be added in an amount of 0.01 to 10 parts by weight based on 100 parts by weight of the binder resin.

The leveling agent may allow the surface of the coating film that is coated with the composition for an anti-glare film according to the present invention to be even.

Since the wetting agent may function to reduce the surface energy of the composition for an anti-glare film according to the present invention, the uniform coating may be obtained when the composition for the anti-glare film is coated on the transparent substrate layer.

The defoaming agent may be added to remove bubbles in the composition for an anti-glare film according to the present invention.

The silica is an inorganic material particle, and is added to increase the resistance to scratch and film strength of the coating film. In the case the particle diameter is in the range of 1 to 50 nm, since a transparent coating film may be ensured and optical properties of the coating film cannot be affected, which is desirable.

Meanwhile, the anti-glare coating film according to the present invention includes a binder resin, and an anti-glare layer that includes an organic particle which is included in an amount of 1 to 30 parts by weight based on 100 parts by weight of the binder resin and in which concave and convex patterns are formed on a surface thereof.

In configuration of the anti-glare layer, the description of the composition for an anti-glare film according to the present invention is all applied thereto. Thus, a detailed description thereof will be omitted.

The anti-glare coating film may further include a transparent substrate layer that is provided at least one side of the anti-glare layer and/or a low reflective layer that is provided on the anti-glare layer.

The thickness of the low reflective layer may be in the range of 40 to 200 nm, and the refractive index of the low reflective layer may be in the range of 1.2 to 1.45.

Examples of the low refractive material that forms the low reflective layer include metal fluorides having the refractive index of 1.40 or less such as NaF, LiF, $AlF_3$, $Na_5Al_3F_{14}$, $Na_3AlF_6$, $MgF_2$, and $YF_3$. They may be used alone or in a mixture of two or more species, and it is preferable that the size be in the range of 1 to 100 nm.

In addition, fluorine-based silane that is used in the low reflective layer is tridecafluorocctyltriethoxy silane, heptadecafluorodecyltrimethoxy silane, or heptadecafluorode-cyltriisopropoxy silane, and they may be used alone or in a mixture of two or more species. The material that forms the low reflective layer is not limited thereto.

The anti-glare film may further include a transparent substrate layer that is provided on at least one side of the anti-glare layer and/or an anti-pollution layer that is provided on the anti-glare layer.

The thickness of the anti-pollution layer may be in the range of 0 to 100 nm, and the anti-pollution layer may be formed by using a monofunctional and polyfunctional acrylate including a fluorine group, but not limited thereto.

The anti-glare film according to the present invention may include a transparent substrate layer; and an anti-glare layer that is provided on the transparent substrate layer and is formed of a composition for an anti-glare film.

In addition, the anti-glare film according to the present invention may include a transparent substrate layer; an anti-glare layer that is provided on the transparent substrate layer and is formed of a composition for an anti-glare film; and a low reflective layer that is provided on the anti-glare layer.

In addition, the anti-glare film according to the present invention may include a transparent substrate layer; an anti-glare layer that is provided on the transparent substrate layer and is formed of a composition for an anti-glare film; and an anti-pollution layer that is provided on the anti-glare layer.

In addition, the anti-glare film according to the present invention may include a transparent substrate layer; an anti-glare layer; a low reflective layer; and an anti-pollution layer.

The anti-glare film according to the present invention may be used for high resolution flat panel displays.

Meanwhile, a method of producing the anti-glare film according to the present invention may include steps of a) coating the composition for an anti-glare film a wording to the present invention on the transparent substrate layer; and b) curing the resulting film.

In the step a), a wet coating method may be used, and examples thereof may include a roll coating method, a bar coating method, a spray coating method, a dip coating method, and a spin coating method. The coating method is not limited thereto, and needless to say, various types of different coating methods that are known in the art may be used.

The step b) may be performed while being divided into a drying step and a curing step, or in a single step.

Hereinafter, the present invention will be described in detail with reference to the drawings. However, the scope of the present invention is not limited thereto.

The anti-glare film according to the present invention, as shown in FIG. 1, includes a transparent substrate layer 1; and an anti-glare layer 2 that is layered on the transparent substrate layer 1 and is formed of the composition for an anti-glare film according to the present invention.

The configuration of the transparent substrate layer 1 is not limited, but a layer that is typically used in the art to which the present invention belongs may be used.

For example, the layer may be made of a material selected from triacetylcellulose (TAC), polyethylene terephthalate (PET), polyethylene naphthalate (PEN), poly-carbonate (PC) and a norbornene polymer. However, the material is not limited thereto, but, needless to say, another material that is typically used to produce a transparent substrate layer in the art to which the present invention belongs may be used.

In connection with this, in the case the anti-glare film is applied to a polarizing plate of high resolution display, the transparent substrate layer 1 is preferably produced by using triacetylcellulose.

In the transparent substrate layer 1, the transmittance is at lest 85%, the haze value is 1% or less, and the thickness is in the range of 30 to 120 μm, but not limited thereto.

The anti-glare layer 2 protects the transparent substrate layer 1, has excellent anti-glare property, image clarity and contrast, and functions to improve mechanical strength of the final film.

The anti-glare layer 2 is cured by coating an electronic beam (EB) or ultraviolet (UV) curable binder resin on the transparent substrate layer 1, and the drying thickness thereof may be in the range of 1 to 20 μm.

An acrylate-based resin may be used as the curable binder resin. For example, a reactive acrylate oligomer, a polyfunctional acrylate monomer or a mixture thereof may be used.

The curing condition depends on the combination ratio or the component, and generally, in the case of the electronic beam or UV beam, the irradiation amount thereof is 200 to 1,000 $mJ/cm^2$ and the curing is preferably performed for 1 sec to 10 min.

In the electronic beam or UV curing, in the case the curing time is less than 1 sec, since the binder resin is not sufficiently cured, mechanical properties such as wear resistance may be poor, and in the case the curing time is more than 10 min, the yellowing may occur on the transparent substrate layer 1.

In order to produce the anti-glare layer 2 as shown in FIG. 1, a roll coating method or a bar coating method may be used, but not limited thereto. Various methods that are typically used in the art to which the present invention belongs may be used.

Organic particles 3 in which the surface roughness is controlled are dispersed in the anti-glare layer 2.

In the case the concave and the convex pattern are formed on the surface of the organic particle 3, as shown in FIG. 1, they are positioned in the anti-glare layer 2, the concave and the convex pattern are formed on the surface of the anti-glare layer 2.

In the case the concave and the convex patterns are formed on the surface of the organic particle 3, that is, in the case the surface of the organic particle 3 is rough, incident light from the outside may be scattered in various angles by using the concave and the convex patterns. Thereby, reflection light that is recognized by a user may be reduced.

MODE FOR THE INVENTION

Hereinafter, embodiments of the invention will be described in detail with reference to Examples. The present invention may, however, be embodied in many different forms and should not be construed as being limited to the embodiments set forth herein. Rather, these embodiments are provided such that this disclosure will be thorough and complete and will fully convey the concept of the invention to those skilled in the art.

Example 1

Production of the Composition for the Anti-Glare Film 10 g of the urethane acrylate oligomer, 20 g of dipentaerythritol hexaacrylate (DPHA) as the polyfunctional acrylate monomer, 2 g of the particle which has the average particle diameter of 3.5 μm, the height of the concave and the convex of 300 nm or less formed on the surface thereof, the width of the concave and the convex of 1 μm or less, and the concave and convex distribution of 80%, 30 g of methyl ethyl ketone and 38 g of toluene as the organic solvent, and 2 g of the UV curing initiator were uniformly mixed with each other to produce the composition for the anti-glare film.

(Production of the Anti-Glare Film)

After the composition for the anti-glare film in a liquid phase, which was produced by the above method according to the roll coating method, was coated on the transparent substrate layer (thickness of 80 μm) that was made of triacetyl cellulose so that the drying thickness was 4 μm, UV of 280 mJ/cm$^2$ was irradiated to cure the layer.

Example 2

After the composition for the anti-glare film was produced by using the same method as Example 1, except that the particle which had the average particle diameter of 3.5 μm, the height of the concave and the convex of 580 nm or less formed on the surface thereof, and the width of the concave and the convex of 1.5 an or less was used instead of the particle used in Example 1, the anti-glare film was produced by using this.

Comparative Example 1

After the composition for the anti-glare film was produced by using the same method as Example 1, except that the particle that had the average particle diameter of 3.5 μm and the solid structure but did not have the surface roughness was used instead of the particle used in Example 1, the anti-glare film was produced by using this.

Comparative Example 2

After the composition for the anti-glare film was produced by using the same method as Example 1, except for the amount (2 g) of the particle used in Example 1 was reduced in an amount of 0.1 g, the anti-glare film was produced by using this.

Comparative Example 3

After the composition for the anti-glare film was produced by using the same method as Example 1, except for the amount (2 g) of the particle used in Example 1 was increased in an amount of 10 g, the anti-glare film was produced by using this.

Experimental Example 1

FIGS. 2 to 4 are scanning electronic microscope (SEM) pictures that illustrate the surface roughness of particles that are used in Examples 1 and 2, and Comparative Examples 1 to 3.

FIG. 2 is a scanning electronic microscope picture of particles that are used in Example 1, Comparative Example 1 and Comparative Example 2, and have an average particle diameter of 3.5 μm, the average surface height of the concave and the convex of 300 nm or less, the width of the concave and the convex of 1 μm or less.

FIG. 3 is a scanning electronic microscope picture of core-shell particles that are used in Example 2, and have an average particle diameter of 3.5 μm, the average surface height of the concave and the convex of 580 nm or less, the width of the concave and the convex of 1.5 μm or less.

FIG. 4 is a scanning electronic microscope picture of solid type of particles that are used in Comparative Example 3, and have an average particle diameter of 3.5 μm and no average surface roughness.

Through the scanning electronic microscope pictures of FIGS. 2 to 4, it can be seen that the degree of relative surface roughness can be confirmed in respects to the particles.

Experimental Example 2

Physical properties of the anti-glare films according to Examples 1 and 2 and Comparative Examples 1 to 3 were measured under the following conditions, and the results are described in the following Table 1.

Transmittance (%)

The transmittance was measured by using HR-100 manufactured by Murakami Color Research Laboratory, Co.

Haze Value (%)

The haze value was measured by using HR-100 manufactured by Murakami Color Research Laboratory, Co.

60° Reflection Gloss

The 60° reflection gloss was measured by using micro-TRI-gloss manufactured by BYK Gardner, Co.

Image Clarity

The image clarity was measured by using ICM-IT manufactured by Suga Test Instrument Co., Ltd.

Contrast

The dark room contrast and the bright room contrast were measured based on Korean Standard (KS C IEC 61988-2-1).

Scratch Resistance

Steel cotton (#10000) was provided on the hammer having the weight of 1 kg, and the resulting hammer was rubbed by the anti-glare coating film ten times. Then, the observation was performed.

◎: Number of scratches: 0

○: Number of scratches: thin five scratches having the size of 1 cm or less

Δ: Number of scratches: five or more thin scratches having the size of 1 cm or less or 1 to 3 long scratches having the size of 1 cm or more x: Number of scratches: 3 or more long scratches having the size of 1 cm or more

TABLE 1

| Section | Example 1 | Example 2 | Comparative Example 1 | Comparative Example 2 | Comparative Example 3 |
|---|---|---|---|---|---|
| transmittance (%) | 93.9 | 93.5 | 93.6 | 94.1 | 92.8 |
| Haze (%) | 10.1 | 9.8 | 9.5 | 0.2 | 48 |
| 60° reflection gloss | 80 | 75 | 110 | 135 | 25 |
| Image clarity Contrastratio | 292 | 210 | 150 | 390 | 32 |
| Dark room | 210 | 223 | 213 | 350 | 180 |
| Bright room | 533 | 521 | 520 | 550 | 523 |
| Resistance to scratch | ◎ | ◎ | ◎ | ◎ | X |

As shown in Table 1, in the case of Examples 1 and 2 in which the particle having the controlled surface roughness is used, it can be seen that the storage stability is excellent, and the anti-glare property, image clarity and contrast are excellent.

On the other hand, in the case of Comparative Example 1 in which the particle having no surface roughness is used, the 60° reflection gloss is 110, the anti-glare property of the coating film is reduced, and the storage stability is reduced bemuse of agglomeration between the swollen particles.

In addition, in the case of Comparative Example 2 in which the amount of the particle having the surface roughness is less than 1 part by weight, the haze value is very low, the 60° reflection gloss is 135, and the anti-glare property of the coating film is very poor. In the case of Comparative Example 3 in which the core-shell particle having the surface roughness is more than 30 parts by weight, the anti-glare property is excellent, but the image clarity is significantly reduced.

Optimum Examples of the present invention are described. In connection with this, the used terms are given to illustrate, but are not to be construed to limit the scope of the present invention disclosed in claims.

The invention claimed is:

1. A composition for an anti-glare film comprising:
   a binder resin; and
   an organic particle which is included in an amount of 1 to 30 parts by weight based on 100 parts by weight of the binder resin and in which concave and convex patterns are formed on a surface thereof,
   wherein a height of the concave and convex patterns of the organic particle is in a range of 0.01 to 2 μm, a width of the concave and convex patterns of the organic particle is in a range of 0.01 to 4 μm, and a total distribution ratio of the concave and convex patterns of the organic particle is in a range of 10 to 100% of a total surface area of the organic particle.

2. The composition for an anti-glare film as set forth in claim 1, wherein an average diameter of the organic particle is in the range of 1 to 10 μm.

3. The composition for an anti-glare film as set forth in claim 1, wherein a difference between average refractive indices of the organic particle and the binder resin is 0.01 to 0.3.

4. The composition for an anti-glare film as set forth in claim 1, wherein the organic particle is a single material or a copolymer of two or more materials selected from polystyrene, polymethyl methacrylate, polymethyl acrylate, polyacrylate, polyacrylate-co-styrene, polymethylacrylate-co-styrene, poly-methylmethacrylate-co-styrene, polycarbonate, polyvinyl chloride, poly-butyleneterephthalate, polyethyleneterephthalate, polyamides, polyimides, polysulfone, polyphenylene oxide, polyacetal, epoxy resin, phenol resin, silicon resin, melamine resin, benzoguanamine, polydivinylbenzene, polydi-vinylbenzene-co-styrene, polydivinylbenzene-co-acrylate, polydiallyl phthalate, and triallylisocyanurate polymer.

5. The composition for an anti-glare film as set forth in claim 1, wherein the binder resin is a single material or a mixture of two or more materials selected from a reactive acrylate oligomer and a polyfunctional acrylate monomer.

6. The composition for an anti-glare film as set forth in claim 5, wherein the reactive acrylate oligomer is a single material or a mixture of two or more materials selected from urethane acrylate oligomer, an epoxy acrylate oligomer, polyester acrylate and polyether acrylate.

7. The composition for an anti-glare film as set forth in claim 5, wherein the poly-functional acrylate monomer is a single material or a mixture of two or more materials selected from dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethy-lopropane ethoxy triacrylate, 1,6-hexanedioldiacrylate, propoxylated glycero triacrylate, tripropylene glycol diacrylate and ethyleneglycol diacrylate.

8. The composition for an anti-glare film as set forth in claim 1, further comprising: 50 to 500 parts by weight of an organic solvent based on 100 parts by weight of the binder resin.

9. The composition for an anti-glare film as set forth in claim 1, further comprising: 0.1 to 10 parts by weight of a UV curing initiator based on 100 parts by weight of the binder resin.

10. The composition for an anti-glare film as set forth in claim 1, further comprising: one or more additives selected from a leveling agent, a wetting agent, a defoaming agent and silica having an average particle diameter in the range of 1 to 50 nm.

11. An anti-glare film comprising:
    a binder resin; and
    an anti-glare layer that includes an organic particle which is included in an amount of 1 to 30 parts by weight based on 100 parts by weight of the binder resin and in which concave and convex patterns are formed on a surface thereof,
    wherein a height of the concave and convex patterns of the organic particle is in a range of 0.01 to 2 μm, a width of the concave and convex patterns of the organic particle is in a range of 0.01 to 4 μm, and a total distribution ratio of the concave and convex patterns of the organic particle is in a range of 10 to 100% of a total surface area of the organic particle.

12. The anti-glare film as set forth in claim 11, wherein an average diameter of the organic particle is in the range of 1 to 10 μm.

13. The anti-glare film as set forth in claim 11, wherein a difference between average refractive indices of the organic particle and the binder resin is 0.01 to 0.3.

14. The anti-glare film as set forth in claim 11, wherein the organic particle is a single material or a copolymer of two or more materials selected from polystyrene, polymethyl methacrylate, polymethyl acrylate, polyacrylate, polyacrylate-co-styrene, polymethylacrylate-co-styrene, polymethyl-methacrylate-co-styrene, polycarbonate, polyvinyl chloride, polybutyleneterephthalate, polyethyleneterephthalate, polyamides, polyimides, polysulfone, polyphenylene oxide, polyacetal, epoxy resin, phenol resin, silicon resin, melamine resin, benzoguanamine, polydivinylbenzene, polydi-vinylbenzene-co-styrene, polydivinylbenzene-co-acrylate, polydiallyl phthalate, and triallylisocyanurate polymer.

15. The anti-glare film as set forth in claim 11, wherein the binder resin is a single material or a mixture of two or more materials selected from a reactive acrylate oligomer and a polyfunctional acrylate monomer.

16. The an anti-glare film as set forth in claim 15, wherein the reactive acrylate oligomer is a single material or a mixture of two or more materials selected from urethane acrylate oligomer, an epoxy acrylate oligomer, polyester acrylate and polyether acrylate.

17. The anti-glare film as set forth in claim 15, wherein the polyfunctional acrylate monomer is a single material or a mixture of two or more materials selected from dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylopropane ethoxy triacrylate, 1,6-hexanedioldiacrylate, propoxylated glycero triacrylate, tripropylene glycol diacrylate and ethyleneglycol diacrylate.

18. The anti-glare film as set forth in claim 11, further comprising: a transparent substrate layer that is provided on at least one side of the anti-glare layer.

19. The anti-glare film as set forth in claim 11, further comprising: a low reflective layer that is provided on the anti-glare layer.

20. The anti-glare film as set forth in claim 11, further comprising: an anti-pollution layer that is provided on the anti-glare layer.

* * * * *